United States Patent
Euan Waldestrand et al.

(10) Patent No.: US 12,472,692 B2
(45) Date of Patent: Nov. 18, 2025

(54) PROCESS FOR CONTROLLING EXTRUSION SPEED IN 3D PRINTING SYSTEMS

(71) Applicant: Stratasys, Inc., Minnetonka, MN (US)

(72) Inventors: Iris Gisey Euan Waldestrand, Puebla (MX); Jorge Arturo Mijares Tobias, Puebla (MX); William Jack Macneish, III, Santa Ana, CA (US)

(73) Assignee: Stratasys, Inc., Minnetonka, MN (US)

( * ) Notice: Subject to any disclaimer, the term of this patent is extended or adjusted under 35 U.S.C. 154(b) by 0 days.

(21) Appl. No.: 18/841,992

(22) PCT Filed: Feb. 27, 2023

(86) PCT No.: PCT/US2023/063322
§ 371 (c)(1),
(2) Date: Aug. 27, 2024

(87) PCT Pub. No.: WO2023/164682
PCT Pub. Date: Aug. 31, 2023

(65) Prior Publication Data
US 2025/0108563 A1 Apr. 3, 2025

Related U.S. Application Data

(60) Provisional application No. 63/314,683, filed on Feb. 28, 2022.

(51) Int. Cl.
*B33Y 30/00* (2015.01)
*B29C 64/118* (2017.01)
(Continued)

(52) U.S. Cl.
CPC .......... *B29C 64/386* (2017.08); *B29C 64/118* (2017.08); *B33Y 30/00* (2014.12);
(Continued)

(58) Field of Classification Search
None
See application file for complete search history.

(56) References Cited

U.S. PATENT DOCUMENTS 10,394,202 B2 8/2019 Minardi et al.
2018/0093420 A1* 4/2018 Roberts .................. B33Y 50/02
(Continued)

FOREIGN PATENT DOCUMENTS

WO WO-2018226206 A1 * 12/2018
WO 2022/035835 A1 2/2022

OTHER PUBLICATIONS

NEXA3d, Inc,; International Application No. PCT/US2023/063322 filed Feb. 27, 2023; International Search Report and Written Opinion; ISA/US; Aug. 23, 2023; 6 pp.

*Primary Examiner* — Yung-Sheng M Tsui
*Assistant Examiner* — Melody Tsui
(74) *Attorney, Agent, or Firm* — Faegre Drinker Biddle & Reath LLP

(57) ABSTRACT

A process for automatically adjusting print speed in a 3D printer, a system for printing a 3D object, and a method of printing a 3D object. A scaling factor is selected, including a first component for print speed and a second component for print quality, an extrusion nozzle port size is identified, and a maximum volumetric extrusion rate for a filament material and a minimum volumetric extrusion rate for the filament material is identified. An optimized volumetric extrusion rate is calculated from the maximum volumetric extrusion rate, the minimum volumetric extrusion rate, and the scaling factor. An optimized X-Y velocity $V_{xy}$ of a print head based on the optimized volumetric extrusion rate is calculated. A computer numerical control code is adjusted to include the optimized X-Y velocity $V_{xy}$ of the print head.

15 Claims, 6 Drawing Sheets

(51) Int. Cl.
*B29C 64/386* (2017.01)
*B33Y 50/00* (2015.01)
*G05B 19/4099* (2006.01)

(52) U.S. Cl.
CPC .......... *B33Y 50/00* (2014.12); *G05B 19/4099* (2013.01); *G05B 2219/39216* (2013.01); *G05B 2219/49023* (2013.01)

(56) References Cited

U.S. PATENT DOCUMENTS

| | | |
|---|---|---|
| 2018/0147783 A1 | 5/2018 | Bheda et al. |
| 2018/0200955 A1* | 7/2018 | Hoelldorfer ........... B33Y 30/00 |
| 2019/0054700 A1* | 2/2019 | Chandar ................. G06F 17/18 |
| 2020/0101670 A1 | 4/2020 | Howell et al. |
| 2020/0122392 A1* | 4/2020 | Townsend ............. B29C 64/364 |
| 2020/0230874 A1 | 7/2020 | Leibig et al. |

* cited by examiner

PROCESS FOR CONTROLLING EXTRUSION SPEED IN 3D PRINTING SYSTEMS

FIELD

The present disclosure is directed to a process of maximizing extrusion speed, part quality, or balancing extrusion speed and part quality, in a 3D printing system.

BACKGROUND 3D printers utilize a set of instructions, typically in the form of a computer numerical control programming language, to direct the movements of the print head when depositing filament on the print platform. While the print instructions may be manually programed, print instructions are often automatically programmed through computer aided machining (CAM) software that derives the g-code from a computer aided design (CAD) file. The CAD file representing the three-dimensional (3D) object is manipulated by the software to define the printed object scale relative to the design scale, slice the 3D object into a number of layers based on, for example, an assumed filament thickness, divide the object up into chords or segments, define infill, and determine exposed wall thicknesses. Then for each layer, a series of actions is created for moving the print head and depositing the filament. Such actions include defining a home position, starting and stopping locations, distances of travel, rates of travel, interpolation of midpoints, returns to the home position, etc. The series of actions are codified as print instructions as g-code or another form of numerical control code. These instructions are then provided to and executed by the 3D printer.

The instructions, however, may not take into account printing conditions that may be affected by extrusion speed, or how speed may affect localized part quality. While the methods of generating a print file work to achieve their intended purpose, there is a need for new and improved systems and processes for 3D printing. The current methods drive the extrusion process based on a desired path speed but ideally the extrusion process should drive the path speed.

SUMMARY

According to several aspects, the present disclosure relates to a process of automatically adjusting print speed in a 3D printer. The process includes selecting a scaling factor, wherein the scaling factor includes a first component for print speed and a second component for print quality, identifying a extrusion nozzle port size, identifying a maximum volumetric extrusion rate for a filament material and a minimum volumetric extrusion rate for the filament material, calculating an optimized volumetric extrusion rate from the maximum volumetric extrusion rate, the minimum volumetric extrusion rate, and the scaling factor, calculating an optimized X-Y velocity $V_{XY}$ of a print head based on the optimized volumetric extrusion rate, and adjusting a computer numerical control code to include the optimized X-Y velocity $V_{XY}$ of the print head.

In further embodiments of the above, the scaling factor is binary or a sliding scaling factor.

In further embodiments of the above, the optimized volumetric extrusion rate is calculated from the following:

$$\dot{V}_E = C_1 * \dot{V}_{E_{MAX}}(\text{Port Size, Material}) + C_2 * \dot{V}_{E_{MIN}}(\text{Port Size, Material})$$

where $$C_1 + C_2 = 1, \forall\, C_1 \geq 0, C_2 \geq 0$$
$$C_1 = \alpha$$
$$C_2 = 1 - \alpha$$
$$0 \leq \alpha \leq 1$$

wherein $\dot{V}_E$ is the optimized volumetric extrusion rate, $\dot{V}_{E_{MAX}}$ is the maximum volumetric extrusion rate for the filament material through the extrusion nozzle port size, $\dot{V}_{E_{MIN}}$ is the minimum volumetric extrusion rate for the filament material through the extrusion nozzle port size, a is the scaling factor for print quality, $C_1$ is the first component of the scaling factor for print speed and $C_2$ is the second component of the scaling factor for print quality.

In further embodiments of the above, the optimized X-Y velocity $V_{XY}$ of the print head is calculated from the following:

$$V_{XY} = \frac{(\dot{V}_E)}{\text{Width}_{TRACE} * \text{Height}_{TRACE}} = V_E * Eratio$$

$$\dot{V}_E = V_E * \text{Area}_{Filament}$$

$$Eratio = \frac{\text{Area}_{Filament}}{\text{Width}_{TRACE} * \text{Height}_{TRACE}}.$$

wherein, Vxy is the optimized X-Y velocity in either the X or Y direction, $\text{Area}_{Filament}$ is the cross-sectional area of the filament, $\text{Width}_{TRACE}$ is the width of the printed, extruded filament, $\text{Height}_{TRACE}$ is the height of the printed, extruded filament, Eratio is the relation between the $\text{Area}_{Filament}$ and the desired trace cross-sectional area, and $V_E$ is the linear velocity of the extruder motor.

In further embodiments of the above, if the optimized print head velocity VXY exceeds a maximum machine velocity $V_{XY\text{-}MAX}$, then the optimized print head velocity $V_{XY}$ is set at the machine maximum velocity $V_{XY\text{-}MAX}$.

In further embodiments of the above, the process further includes selecting a nozzle temperature based on the optimized volumetric extrusion rate $\dot{V}_E$.

According to several aspects, the present disclosure relates to a system for printing a 3D object. The system includes a print head carried by an x-y carriage, including a nozzle having an extrusion port, wherein the extrusion port exhibits an extrusion nozzle port size, and a processor control system. The processor control system includes executable code to: identify the extrusion nozzle port size of the nozzle extrusion port, identify a maximum volumetric extrusion rate for a filament material and a minimum volumetric extrusion rate for the filament material, calculate an optimized volumetric extrusion rate from the maximum volumetric extrusion rate, the minimum volumetric extrusion rate, and a scaling factor identified by a user, wherein the scaling factor includes a first component for print speed and a second component for print quality, calculate an optimized X-Y velocity $V_{XY}$ of the print head based on the optimized volumetric extrusion rate, and adjust a computer numerical control code to include the optimized X-Y velocity $V_{XY}$ of the print head.

In further embodiments, the processor control system further includes executable code to: calculate the optimized volumetric extrusion rate from the following:

$$\dot{V}_E = C_1 * \dot{V}_{E_{MAX}}(\text{Port Size, Material}) + C_2 * \dot{V}_{E_{MIN}}(\text{Port Size, Material})$$

where $$C_1 + C_2 = 1, \forall\, C_1 \geq 0, C_2 \geq 0$$

$$C_1 = \alpha$$

$$C_2 = 1 - \alpha$$

$$0 \leq \alpha \leq 1$$

wherein $\dot{V}_E$ is the optimized volumetric extrusion rate, $\dot{V}_{E_{MAX}}$ is the maximum volumetric extrusion rate for the filament material through the extrusion nozzle port size, $\dot{V}_{E_{MIN}}$ is the minimum volumetric extrusion rate for the filament material through the extrusion nozzle port size, a is the scaling factor for print quality, $C_1$ is the first component of the scaling factor for print speed and $C_2$ is the second component of the scaling factor for print quality.

In further embodiments of the above, the processor control system further includes executable code to: calculate the optimized X-Y velocity $V_{XY}$ of the print head from the following:

$$V_{XY} = \frac{(\dot{V}_E)}{\text{Width}_{TRACE} * \text{Height}_{TRACE}} = V_E * Eratio$$

$$\dot{V}_E = V_E * \text{Area}_{Filament}$$

$$Eratio = \frac{\text{Area}_{Filament}}{\text{Width}_{TRACE} * \text{Height}_{TRACE}}.$$

where, Vxy is the optimized X-Y velocity in either the X or Y direction, $\text{Area}_{Filament}$ is the cross-sectional area of the filament, $\text{Width}_{TRACE}$ is the width of the printed, extruded filament, $\text{Height}_{TRACE}$ is the height of the printed, extruded filament, Eratio is the relation between the $\text{Area}_{Filament}$ and the desired trace cross-sectional area, and $V_E$ is the linear velocity of the extruder motor.

In further embodiments of the above, the processor control system further includes executable code to: set the optimized X-Y velocity $V_{XY}$ as a machine maximum velocity $V_{XY-MAX}$ if the optimized X-Y velocity $V_{XY}$ exceeds the maximum machine velocity $V_{XY-MAX}$.

In further embodiments of the above, the processor control system further includes executable code to: select a nozzle temperature based on the optimized volumetric extrusion rate $\dot{V}_E$.

According to further embodiments, the present disclosure is directed to a method of printing a three-dimensional object. The method includes generating a computer numerical control code from a computer aided design file representing a three-dimensional object, selecting a filament material, selecting a scaling factor, wherein the scaling factor includes a first component representative of maximizing print speed and a second component representative of maximizing print quality, identifying a extrusion nozzle port size, identifying a maximum volumetric extrusion rate for a filament material and a minimum volumetric extrusion rate for the filament material, calculating an optimized volumetric extrusion rate from the maximum volumetric extrusion rate, the minimum volumetric extrusion rate, and the scaling factor, calculating an optimized X-Y velocity VXY of a print head based on the optimized volumetric extrusion rate, adjusting the computer numerical control code to include the optimized X-Y velocity VXY of the print head, and printing the three-dimensional object.

In further embodiments, the method includes selecting a nozzle temperature based on the optimized volumetric extrusion rate $\dot{V}_E$.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to a process of maximizing extrusion speed, part quality, or balancing extrusion speed and part quality, in a 3D printing system. The process and system uses a scaling factor for automatically adjusting the velocity of the print head in the computer numerical control code used to control the printer. In aspects, the scaling factor includes at least two components, wherein at least one component is selected by the user and the second component is calculated from the first component. The user selects the scaling factor based on the degree to which print speed is prioritized over print quality, or vice versa. In aspects, the user may elect to balance print speed with print quality, select relatively greater print speed over print quality, or select relatively lower print speed over print quality, wherein print quality is understood to be a reference to the surface finish of the completed part.

As noted above, 3D printers utilize a set of instructions, typically in the form of a computer numerical control programming language, to direct the movements of a print head when depositing filament on the print platform. The computer numerical control code often uses g-code, however, other numerical control codes may alternatively, or additionally, be used. The print instructions, in the form of executable code, may be programmed into computer aided machining (CAM) software or derived from a computer aided design (CAD) file into computer aided machining (CAM) software. In aspects, the processes are coded or embodied by one or more of a number of programming languages including, but not limited to, at least one of the following: C#, C++, Python and Java.

Figure 1:
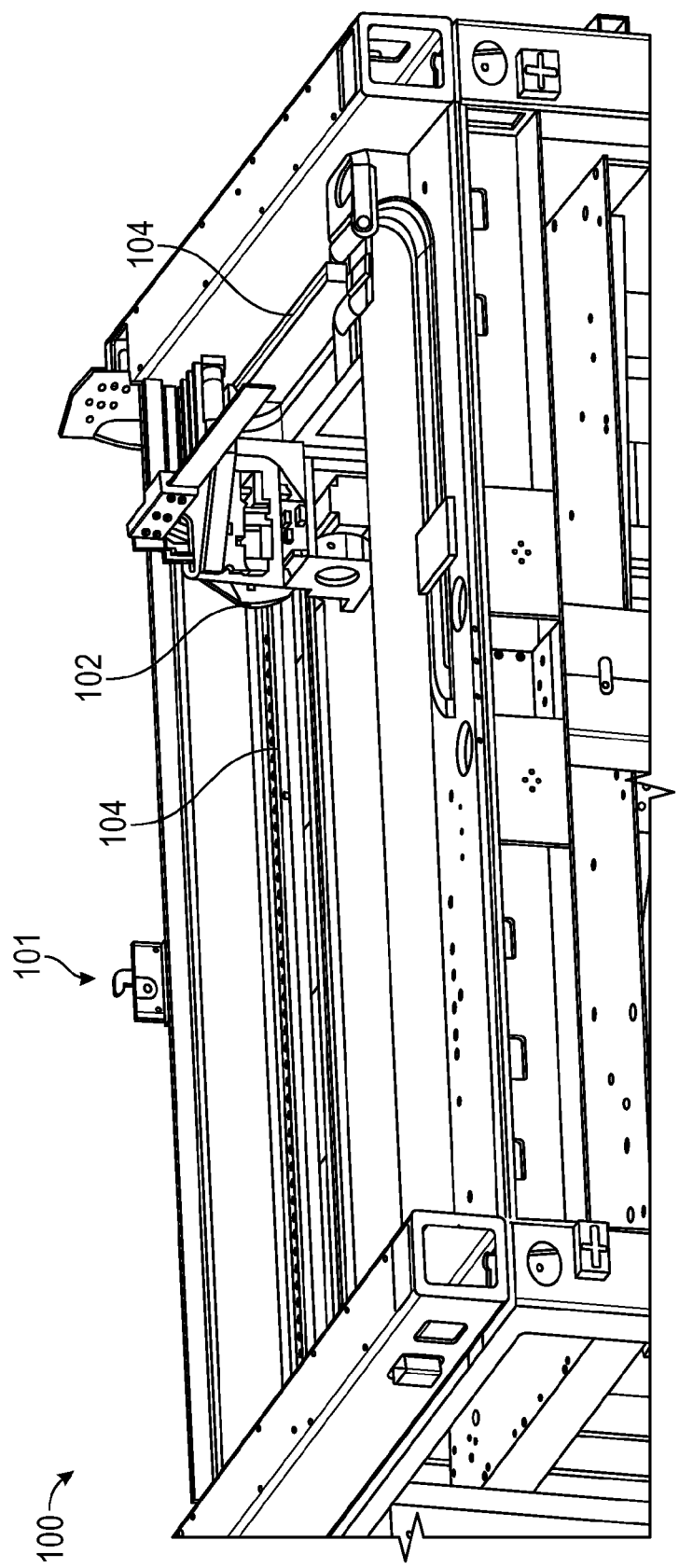
FIG. 1 illustrates an embodiment of a 3D printer including a print head carried by an x-y carriage, according to an exemplary embodiment of the present disclosure.
Figure 2:
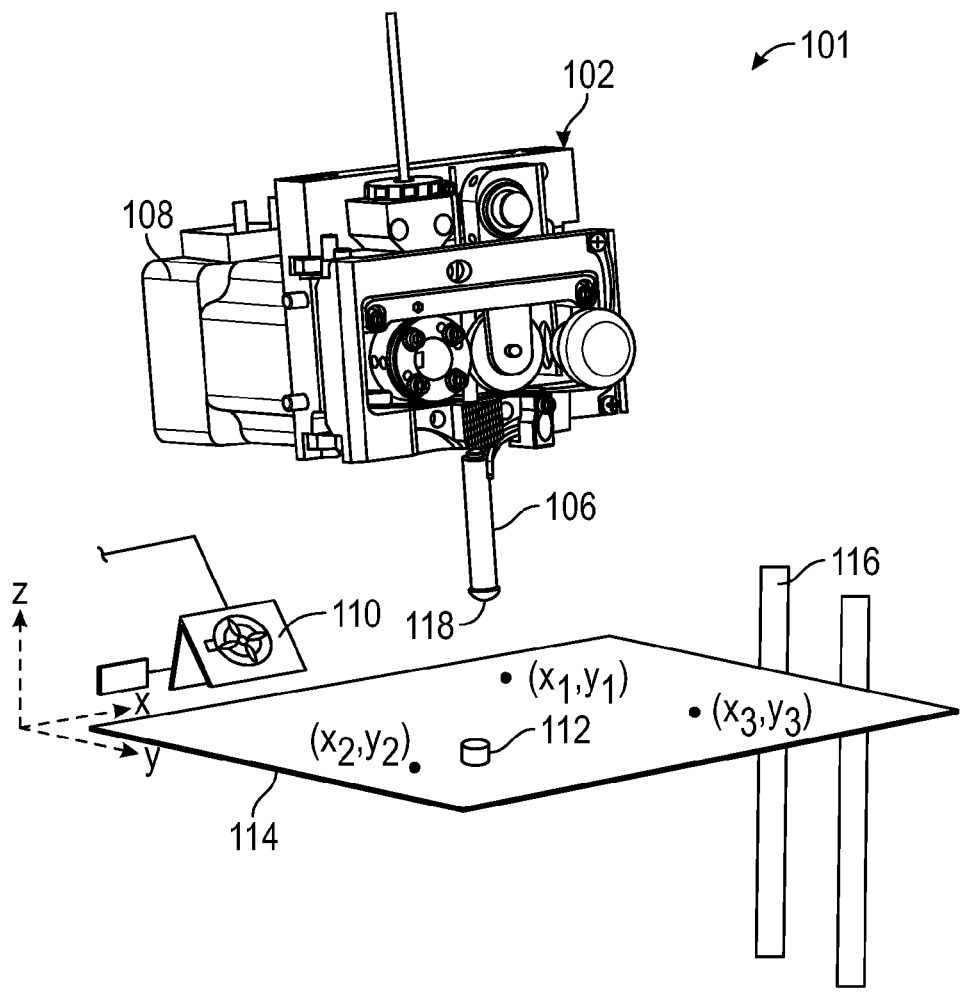
FIG. 2 illustrates an embodiment of a print head, a print platform, a cooling fan and a 3d printed object on the print platform, according to an exemplary embodiment.
Figure 3:
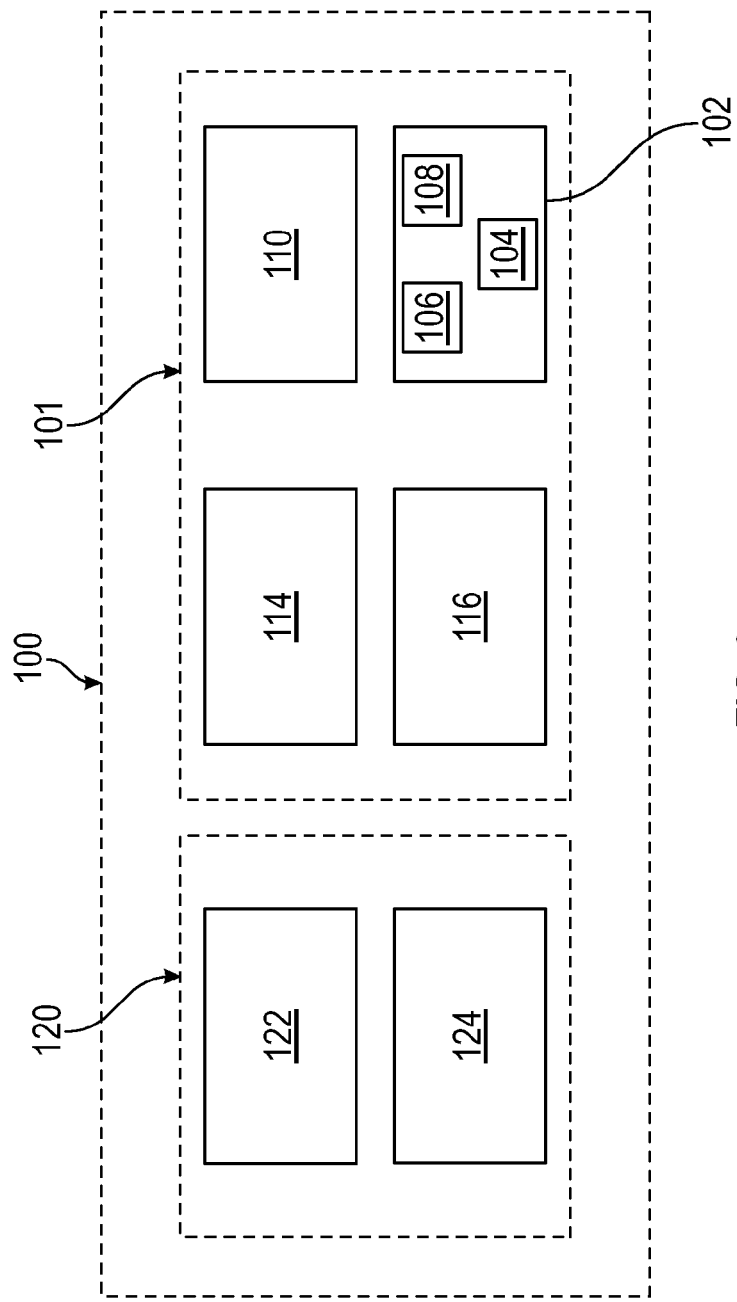
FIG. 3 illustrates a system for printing a 3D object, including a 3D printer and a processor control unit for optimizing the executable code for the 3D printer, according to an exemplary embodiment.

FIGS. 1 through 3 illustrate an aspect of a system 100 for printing 3D objects by filament extrusion. The system 100 includes a 3D printer 101. The 3D printer 101 includes a print head 102 carried by an X-Y carriage 104. The print head 102 includes a heated nozzle 106, from which the filament material is extruded, and a feed motor 108 for feeding the filament material into the extruder. The system 100 further includes a fan 110 for cooling the heated nozzle 106 and the printed 3D object 112. A print platform 114 is further provided upon which the 3D object 112 is printed. The print platform 114 is moveable on a z-axis gantry 116 in the z-direction relative to the print head 102 to accommodate layers of extruded filament as the 3D object 112 is printed.

As illustrated in FIG. 3, the system 100 further includes a processor control system 120 that includes one or more processors 124, which in aspects are microprocessors. The processor control system 120 includes hardware, firmware, and software for parsing, analyzing, and modifying computer numerical control code and providing an executable code for the 3D printer 101. The processor control system 120, in aspects, resides in a computer independent of the 3D printer 101 and the output is provided to the 3D printer 101, or the processor control system 120 resides within the 3D printer 101 itself. Where more than one processor 124 is present in the processor control system 120 the processors 124 perform distributed or parallel processing protocols and the processors 124 may include, for example, application specific integrated circuits, a programmable gate array include a field programmable gate array, a graphics processing unit, a physics processing unit, digital-signal processor, or a front-end processor. The processor control system 120 is understood to be preprogrammed to execute code or instructions to perform, for example, operations, acts, tasks, functions, or steps coordinating with other devices and components to perform operations when needed.

The processor control system 120 also includes or accesses information stored in memory 122, with which the processor 124 is operatively coupled, regarding the filament materials that may be printed with the 3D printer 101 as well as various characteristics of the 3D printer 101. Memory is understood as a physical device capable of storing information temporarily, such as in the case of random-access memory, or permanently, such as in the case of read-only memory. Representative physical devices include hard disk drives, solid state drives, optical discs, or storage accessible through the cloud over networks.

Information stored in memory 122 regarding filament materials include, for example, filament process temperature ranges and filament viscosity ranges for a given nozzle 106 extrusion port 118 size at which the filament may be extruded as well as a predicted feed motor power for feeding the filament at those temperature and viscosity ranges through the given port sizes. It is noted that filament process temperatures include, in aspects, temperatures where the filament begins to soften and flow, such as above one of the Vicat softening temperature and heat deflection temperature, and below the material degradation temperature, including, in aspects, temperatures 20 degrees Celsius below the filament melt temperature to temperatures greater than the filament melt temperature. In addition, the volumetric extrusion rate for each filament material is stored. The volumetric extrusion rate is understood as the volume of filament that can be extruded from the nozzle 106 extrusion port 118 in a given period of time. It should be appreciated that the volumetric extrusion rates are temperature dependent, as well as dependent on the material viscosity (or the ability of the material to flow upon application of a given force) at a given temperature. The relationships between temperature, viscosity, port size and volumetric extrusion rates for a given filament material may be characterized in advance and stored within the memory 122. In aspects, a maximum volumetric extrusion rate is set where the extruded filament undergoes various distortions or instabilities, such as when the extruded filament is exposed to a shear stress above a critical shear stress, or when cold coring occurs due to the inability to provide sufficient heat to the filament to allow the filament to flow. Shear stress being dependent on force applied, nozzle geometry, and viscosity of the fluid at a given temperature, and the critical shear stress being a shear stress above which distortions and instabilities are observed in the extruded filament. In aspects, the minimum volumetric extrusion rate is also selected to avoid instabilities as well as jamming, based on factors such as the length of the nozzle barrel, nozzle port size, material temperature, and viscosity. For example, while an ideal temperature may be selected for a certain velocity, however, friction may be caused by semi-melted or cold material causing instability. It should further be appreciated that individual data points may be stored for each material, each nozzle 106 extrusion port 118 size, etc., or functions representing the data may be stored and utilized.

Machine characteristic data stored in memory 122 include the nozzle 106 extrusion port 118 size and maximum print head velocity $V_{XY-MAX}$ in the XY direction. The size of the nozzle 106 extrusion port 118 is understood as the cross-sectional area of the nozzle 106 opening from which the filament is extruded from and deposited on the print platform 114. The maximum print head velocity $V_{XY-MAX}$ in the XY direction is understood as the fastest rate at which the print head 102 moves in the 3D printer 101.

In addition, the processor 124 also includes or accesses information, stored in memory 122 with which the processor 124 is operatively coupled, regarding additional machine dynamics including, in aspects, the thermal characteristics of the heated nozzle 106, such as the rate at which the heated nozzle 106 increases in temperature upon the application of heating power or decreases in temperature upon the application of fan power. Information stored regarding machine dynamics further includes, in aspects, the maximum acceleration and maximum deceleration of the print head 102 in either the X or the Y direction. Further machine dynamics information also includes, in aspects, the maximum and minimum feed motor power range, the maximum and minimum heated nozzle power range, and the maximum and minimum fan power range.

Figure 4:
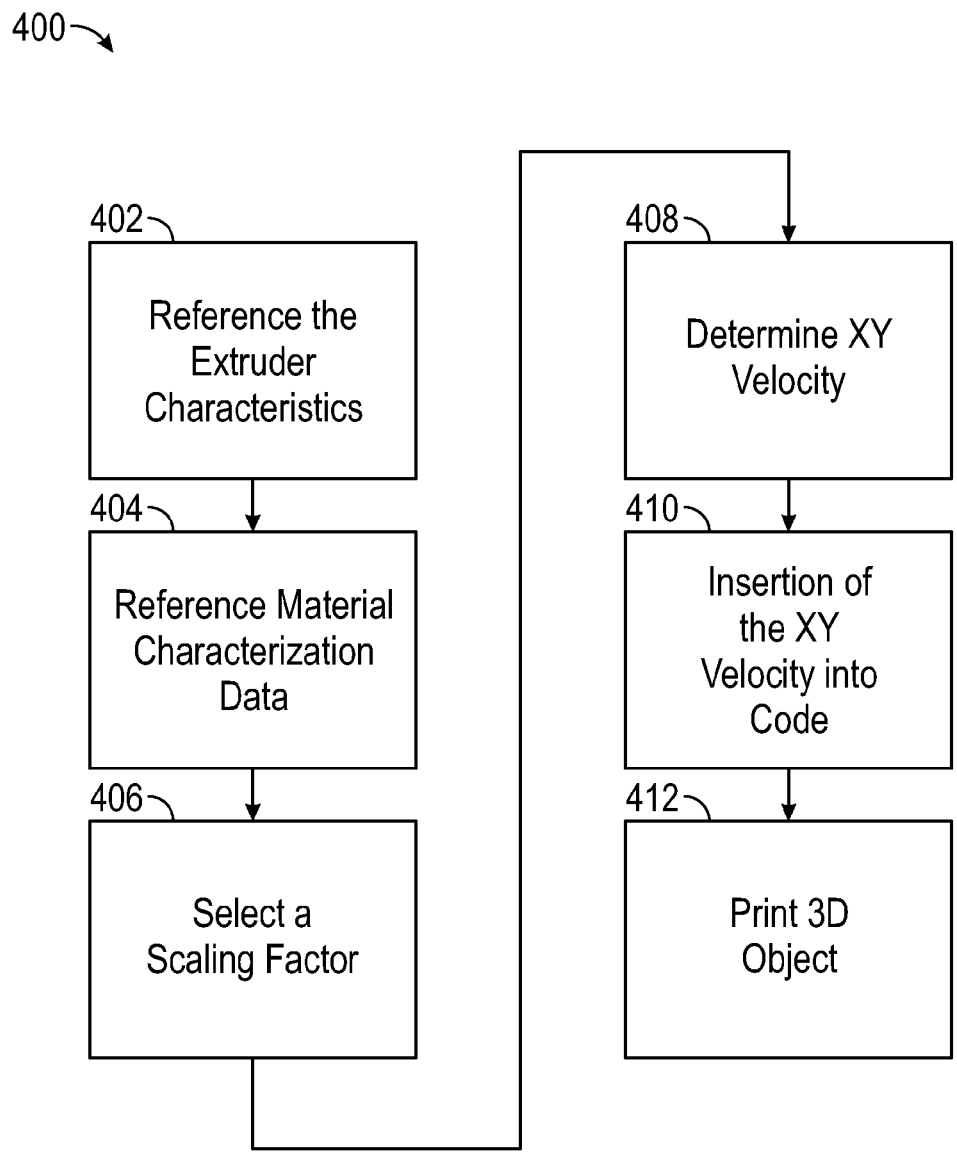
FIG. 4 illustrates a process for automatically adjusting computer numerical control code for printing a 3D object based on a user selected scaling factor according to an exemplary embodiment.

FIG. 4 illustrates various aspects of a process 400 for automatically adjusting print speed and part quality in a 3D printing system 100. At block 402, the processor 124 references the machine characteristics including, in aspects, the nozzle 106 extrusion port 118 size as well as the maximum X-Y velocity $V_{XY-MAX}$ of the print head 102. It should be appreciated that, generally, the $V_{XY}$ of the print head 102 is understood as the velocity at which the print head 102 travels in the X and Y direction relative to the print platform 114 (see FIG. 2). The maximum X-Y velocity $V_{XY-MAX}$ is determined based on factors such as the power and speeds of the motor(s) used to drive the print head 102 and the X-Y carriage 104, the size of the print head 102, etc.

At block 404, the filament material is selected, and the filament material characterization data is referenced to determine, as alluded to above, the maximum and minimum operating temperatures for the filament material, the maximum and minimum volumetric extrusion rates of the filament material due to, e.g., material viscosity at temperatures between the maximum and minimum operating temperatures, and the maximum and minimum extruder velocity based on port size. In aspects, blocks 402 and 404 are performed one after the other, at the same time, or in reverse order.

At block 406 a scaling factor is calculated based on an input from the user as to whether the user favors print speed or print quality. In aspects, the scaling factor is based on a binary selection between maximizing one of print speed and print quality. In alternative aspects, the scaling factor is a sliding scale, wherein the user selects the degree to which either print speed or print quality is prioritized.

For example, if a sliding scale is used, the user may select an interval from 0 to 1, wherein 0 is maximizing print quality and 1 is maximizing print speed. If 1 is selected, print speed is maximized and the 3D printer 101 prints at the maximum print head velocity $V_{XY\text{-}MAX}$ even though print quality may be relatively lower. If 0 is selected, print quality is maximized and the 3D printer 101 prints at the lowest print head velocity available for the filament material, even though print speed may be relatively lower. If 0.5 is selected, then print speed and print quality are balanced. Accordingly, it should be appreciated that the scaling factor, in aspects, includes two components, a first component for print speed and a second component for print quality, wherein the user selects one of the two components and the other of the two components is determined from the user selection. It should be appreciated that the interval may be reversed, that is, in aspects, 0 is selected for maximizing the print speed and 1 is selected for maximizing the print quality.

The sliding scale is then used to calculate an optimized volumetric extrusion rate and an optimized extrusion velocity from the maximum and minimum volumetric extrusion rates for the selected filament material stored in memory 122. In aspects, the following equations (EQ1.) and (EQ2.) may be used to calculate an optimized volumetric extrusion rate based on the scaling factor, a, selected by the user, and in aspects the degree to which, print speed or print quality are indicated as being more desirable.

$$\dot{V}_E = C_1 * \dot{V}_{E_{MAX}}(\text{Port Size, Material}) + \qquad \text{EQ. 1}$$

$$C_2 * \dot{V}_{E_{MIN}}(\text{Port Size, Material})$$

where $$C_1 + C_2 = 1, \forall\ C_1 \geq 0, C_2 \geq 0 \qquad \text{EQ2.}$$

The user selected scaling factor (a) is used to determine $C_1$ and $C_2$ as follows.

$$C_1 = \alpha$$
$$C_2 = 1 - \alpha$$
$$0 \leq \alpha \leq 1$$

$\dot{V}_E$ is the optimized volumetric extrusion rate, $\dot{V}_{E^{MAX}}$ is the maximum volumetric extrusion rate for a given material through a given nozzle 106 extrusion port 118 size, $\dot{V}_{E^{MIN}}$ is the minimum volumetric extrusion rate for the given material through the given nozzle 106 extrusion port 118 size, $C_1$ is a first component of the scaling factor and $C_2$ is the second component of the scaling factor, wherein $C_1$ and $C_2$ are determined based on the user selected scaling factor α. It should be appreciated that, in some aspects, the scaling factor is pre-selected and not selected by a given user. From this function, the optimized volumetric extrusion rate is determined, which can then be used at block 408 to determine the optimized X-Y velocity $V_{XY}$ of the print head 102 for achieving the user selected balance between print speed and print quality using the following function.

$$V_{XY} = \frac{(\dot{V}_E)}{\text{Width}_{TRACE} * \text{Height}_{TRACE}} = V_E * Eratio$$

$$\dot{V}_E = V_E * \text{Area}_{Filament}$$

$$Eratio = \frac{\text{Area}_{Filament}}{\text{Width}_{TRACE} * \text{Height}_{TRACE}}$$

Where, $V_{xy}$ is the optimized X-Y velocity in either the X or Y direction, $\text{Area}_{Filament}$ is the cross-sectional area of the filament entering the nozzle 106, $\text{Width}_{TRACE}$ is the cross-sectional width of the printed, extruded filament, $\text{Height}_{TRACE}$ is the cross-sectional height of the printed, extruded filament, Eratio is the relation between the $\text{Area}_{Filament}$ entering the extruder and the desired trace cross-sectional area, and $V_E$ is the linear velocity of the extruder motor. If the optimized X-Y velocity $V_{XY}$ exceeds the maximum machine velocity ($V_{XY\text{-}MAX}$), then the optimized X-Y velocity $V_{XY}$ is limited at the maximum machine velocity ($V_{XY\text{-}MAX}$). It should be appreciated that $\text{Width}_{TRACE}*\text{Height}_{TRACE}$ may be replaced by another representation of cross-sectional area of the printed filament.

Figure 5:
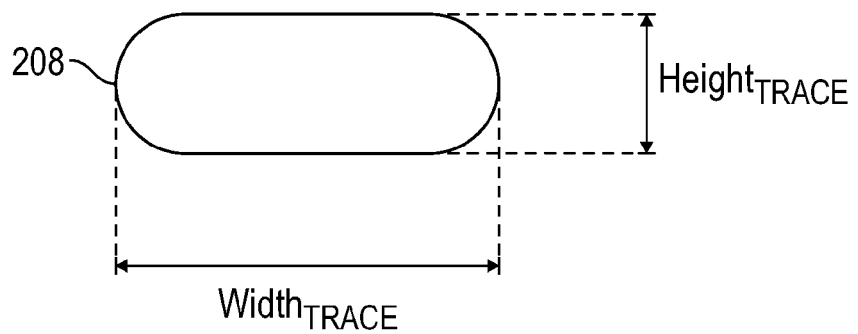
FIG. 5 illustrates a printed filament according to an exemplary embodiment.

In aspects, $\text{Area}_{Filament}$ is known and stored in memory 122 for a given material. In addition, in aspects, the extruded filament width $\text{Width}_{TRACE}$ and height $\text{Height}_{TRACE}$, illustrated in FIG. 5, for a given filament material 208 at various extrusion temperatures and extrusion port 118 sizes is calculated and stored in memory 122 for each nozzle 106 extrusion port 118 size. Alternatively, the computer numerical control code, e.g., g-code, is analyzed to determine the Eratio which could be obtained by the Gcode parameters of commanded travel distance and commanded extrusion distance $$\frac{XY_{Distance}}{E_{Distance}}.$$

Figure 6A:
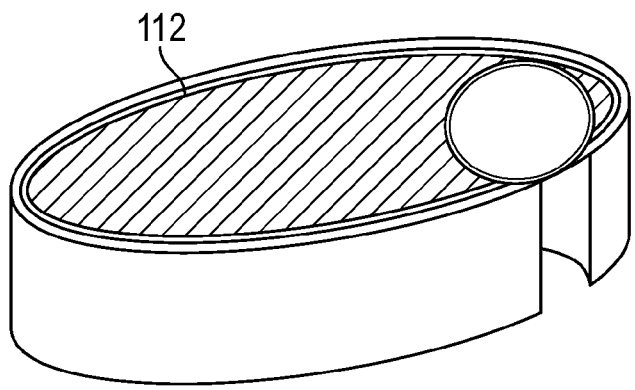
FIG. 6A illustrates a 3D printed object, according to an exemplary embodiment.
Figure 6B:
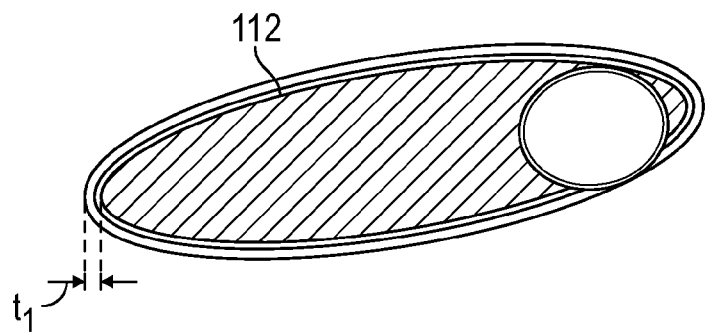
FIG. 6B illustrates a layer of a 3D printed object, according to an exemplary embodiment.

For example, a CAD file representing a three-dimensional (3D) object 112 is manipulated in a slicer, which slices the 3D object into a number of layers of a given thickness $t_1$ based on, e.g., an assumed filament thickness, which may be adjusted by adjusting the distance in the z-direction (see FIG. 2) between the extrusion port 118 of the nozzle 106 and the print platform 114 or an adjacent layer of the 3D object 112. The slicer also divides each layer into a series of actions for moving the print head 102 and depositing the filament material, creating instructions for the printer in the form of computer numerical control code, such as g-code. FIG. 6A illustrates a printed 3D object 112 and FIG. 6B illustrates an example of a layer 202 of the 3D object 112 sliced into layers. The Width$_{TRACE}$ and Height$_{Trace}$ are then determined based on one or more of the following: the calculated path to create the layer, the extrusion port 118 size, a desired Height$_{Trace}$, and a desired Width$_{TRACE}$.

The computer numerical control code is then modified at block 410 by overriding the slicer speed commands with the optimized X-Y velocity V$_{XY}$ of the print head 102 when printing the 3D object 112. In addition, at block 410 other commands may be overridden or optimized, such as the temperature of heated nozzle 106. Temperature optimization is based on the optimized volumetric extrusion rate $\dot{V}_E$, wherein nozzle temperature of the heated nozzle 106 is selected from a table of values that correlates the optimized volumetric extrusion rate $\dot{V}_E$ to a nozzle temperature for a given material. The slicer temperature commands may then be adjusted by the selected optimized nozzle temperature. In aspects, at block 412, the 3D printer 101 then uses the modified computer numerical control code to print the 3D object 112.

Figure 7:
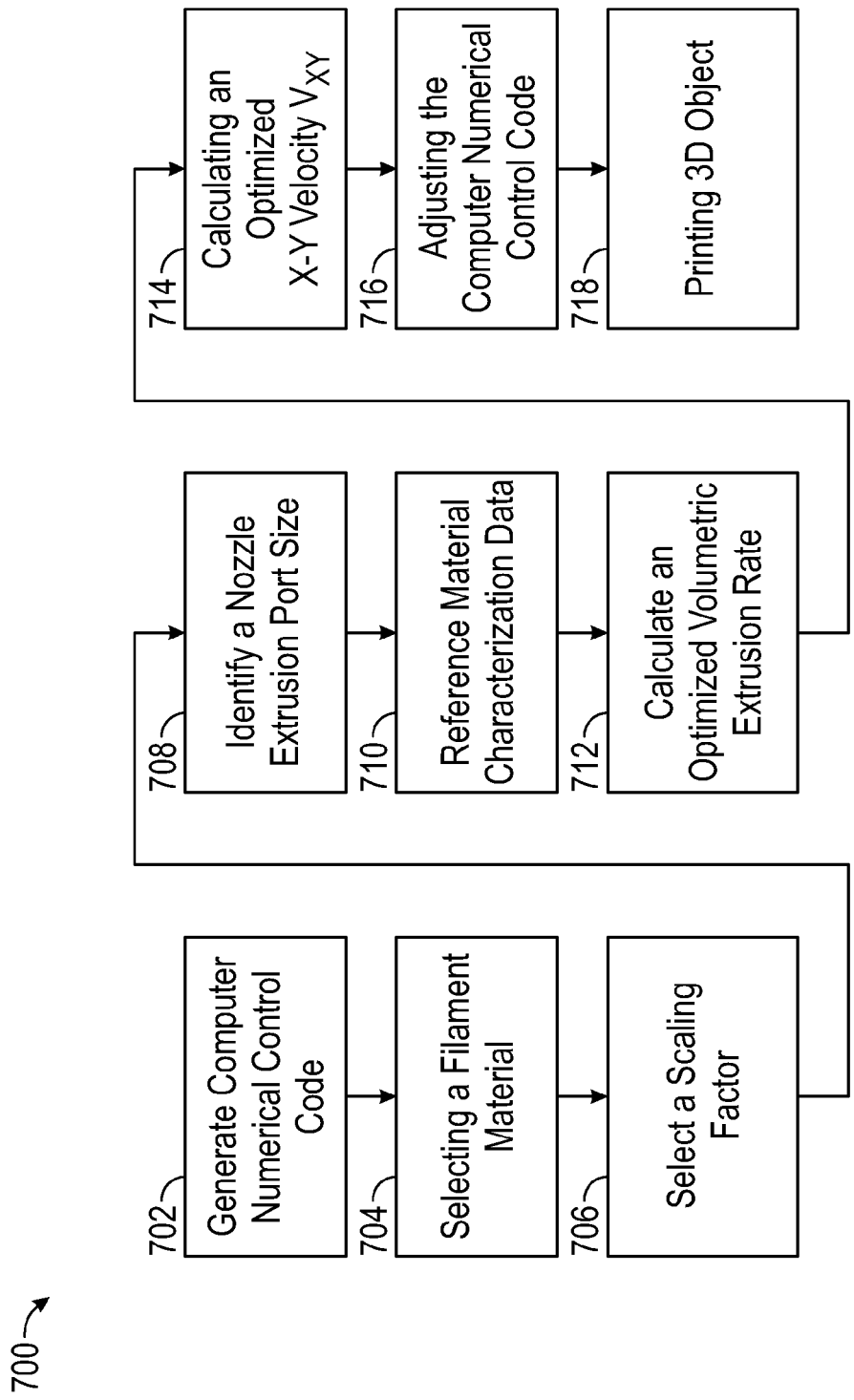
FIG. 7 illustrates a method for printing a 3D object, according to an exemplary embodiment.

In aspects, a method of printing a three-dimensional (3D) object 112 is also provided herein as illustrated in FIG. 7. The method 700 includes, at block 702, generating a computer numerical control code from a computer aided design file representing a three-dimensional object and selecting a filament material at block 704. The method further includes selecting a scaling factor 706, wherein, as noted above, the scaling factor includes a first component representative of maximizing print speed and a second component representative of maximizing print quality. The method 700 further includes identifying a extrusion nozzle port size 708, referencing material characterization data to identify a maximum volumetric extrusion rate for a filament material and a minimum volumetric extrusion rate for the filament material 710 and calculating an optimized volumetric extrusion rate from the maximum volumetric extrusion rate, the minimum volumetric extrusion rate, and the scaling factor 712. The method 700 yet further includes calculating an optimized X-Y velocity V$_{XY}$ of a print head based on the optimized volumetric extrusion rate 714, adjusting the computer numerical control code to include the optimized X-Y velocity V$_{XY}$ of the print head 716, and printing the three-dimensional object 718.

The process, method, and system of the present disclosure offer several advantages, these advantages include automated adjustment to the computer numerical control code and print head velocity in the X-Y direction to achieve the desired balance between print speed and print quality based on user selection.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A process of automatically adjusting print speed in a 3D printer, comprising:
   selecting a scaling factor, wherein the scaling factor includes a first component for print speed and a second component for print quality;
   identifying an extrusion nozzle port size;
   identifying a maximum volumetric extrusion rate for a filament material and a minimum volumetric extrusion rate for the filament material;
   calculating an optimized volumetric extrusion rate from the maximum volumetric extrusion rate, the minimum volumetric extrusion rate, and the scaling factor;
   calculating an optimized X-Y velocity V$_{XY}$ of a print head based on the optimized volumetric extrusion rate; and
   adjusting a computer numerical control code to include the optimized X-Y velocity V$_{XY}$ of the print head,
   wherein:
   the optimized volumetric extrusion rate is calculated from the following:

$$\dot{V}_E = C_1 * \dot{V}_{E_{MAX}}(\text{Port Size, Material}) + C_2 * \dot{V}_{E_{MIN}}(\text{Port Size, Material})$$

where $$C_1 + C_2 = 1, \forall\, C_1 \geq 0,\, C_2 \geq 0$$

$$C_1 = \alpha$$

$$C_2 = 1 - \alpha$$

$$0 \leq \alpha \leq 1$$

wherein $\dot{V}_E$ is the optimized volumetric extrusion rate, $\dot{V}_{E_{MAX}}$ is the maximum volumetric extrusion rate for the filament material through the extrusion nozzle port size, $\dot{V}_{E_{MIN}}$ is the minimum volumetric extrusion rate for the filament material through the extrusion nozzle port size, α is the scaling factor for print quality, C$_1$ is the first component of the scaling factor for print speed and C$_2$ is the second component of the scaling factor for print quality.

2. The process of claim 1, wherein the scaling factor is binary.

3. The process of claim 1, where the scaling factor is a sliding scaling factor.

4. The process of claim 1, wherein the optimized X-Y velocity V$_{XY}$ of the print head is calculated from the following:

$$V_{XY} = \frac{(\dot{V}_E)}{\text{Width}_{TRACE} * \text{Height}_{TRACE}} = V_E * Eratio$$

$$\dot{V}_E = V_E * \text{Area}_{Filament}$$

$$Eratio = \frac{\text{Area}_{Filament}}{\text{Width}_{TRACE} * \text{Height}_{TRACE}}.$$

wherein, V$_{xy}$ is the optimized X-Y velocity in either the X or Y direction, Area$_{Filament}$ is the cross-sectional area of the filament, Width$_{TRACE}$ is the width of the printed, extruded filament, Height$_{TRACE}$ is the height of the printed, extruded filament, E$_{ratio}$ is the relation between the Area$_{Filament}$ and the desired trace cross-sectional area, and V$_E$ is the linear velocity of the extruder motor.

5. The process of claim 4, wherein if the optimized print head velocity V$_{XY}$ exceeds a maximum machine velocity V$_{XY-MAX}$, then the optimized print head velocity V$_{XY}$ is set at the machine maximum velocity V$_{XY-MAX}$.

6. The process of claim 4, further comprising selecting a nozzle temperature based on the optimized volumetric extrusion rate $\dot{V}_E$.

7. The process of claim 6, wherein the computer numerical control code is first generated by a slicer and the process further comprises overriding a slicer temperature command with the nozzle temperature.

8. The process of claim 1, wherein the computer numerical control code is first generated by a slicer and the process further comprises overriding a slicer speed command with the optimized X-Y velocity $V_{xy}$ of the print head.

9. A system for printing a 3D object, comprising:
a print head carried by an x-y carriage, including a nozzle having an extrusion port, wherein the extrusion port exhibits a extrusion nozzle port size; and
a processor control system, wherein the processor control system includes executable code to:
identify the extrusion nozzle port size of the nozzle extrusion port;
identify a maximum volumetric extrusion rate for a filament material and a minimum volumetric extrusion rate for the filament material;
calculate an optimized volumetric extrusion rate from the maximum volumetric extrusion rate, the minimum volumetric extrusion rate, and a scaling factor identified by a user, wherein the scaling factor includes a first component for print speed and a second component for print quality;
calculate an optimized X-Y velocity $V_{XY}$ of the print head based on the optimized volumetric extrusion rate;
adjust a computer numerical control code to include the optimized X-Y velocity $V_{XY}$ of the print head;
calculate the optimized volumetric extrusion rate from the following:

$$\dot{V}_E = C_1 * \dot{V}_{E_{MAX}}(\text{Port Size, Material}) + C_2 * \dot{V}_{E_{MIN}}(\text{Port Size, Material})$$

where $$C_1 + C_2 = 1, \forall\ C_1 \geq 0, C_2 \geq 0$$
$$C_1 = \alpha$$
$$C_2 = 1 - \alpha$$
$$0 \leq \alpha \leq 1$$

wherein $\dot{V}_E$ is the optimized volumetric extrusion rate, $\dot{V}_{E_{MAX}}$ is the maximum volumetric extrusion rate for the filament material through the extrusion nozzle port size, $\dot{V}_{E_{MIN}}$ is the minimum volumetric extrusion rate for the filament material through the extrusion nozzle port size, a is the scaling factor for print quality, $C_1$ is the first component of the scaling factor for print speed and $C_2$ is the second component of the scaling factor for print quality; and
calculate the optimized X-Y velocity $V_{XY}$ of the print head from the following:

$$V_{XY} = \frac{(\dot{V}_E)}{\text{Width}_{TRACE} * \text{Height}_{TRACE}} = V_E * Eratio$$

$$\dot{V}_E = V_E * \text{Area}_{Filament}$$

$$Eratio = \frac{\text{Area}_{Filament}}{\text{Width}_{TRACE} * \text{Height}_{TRACE}}.$$

wherein, $V_{xy}$ is the optimized X-Y velocity in either the X or Y direction, $\text{Area}_{Filament}$ is the cross-sectional area of the filament, $\text{Width}_{TRACE}$ is the width of the printed, extruded filament, $\text{Height}_{TRACE}$ is the height of the printed, extruded filament, $E_{ratio}$ is the relation between the $\text{Area}_{Filament}$ and the desired trace cross-sectional area, and $V_E$ is the linear velocity of the extruder motor.

10. The system of claim 9, wherein the processor control system further includes executable code to: set the optimized X-Y velocity $V_{XY}$ as a machine maximum velocity $V_{XY-MAX}$ if the optimized X-Y velocity $V_{XY}$ exceeds the maximum machine velocity $V_{XY-MAX}$.

11. The system of claim 10, wherein the processor control system further includes executable code to: select a nozzle temperature based on the optimized volumetric extrusion rate $\dot{V}_E$.

12. The system of claim 11, further comprising non-transitory memory operatively coupled to the processor control system, wherein the memory includes information regarding the filament material and a plurality of machine characteristics.

13. The system of claim 12, wherein the memory further includes information regarding machine dynamics including the machine maximum velocity $V_{XY-MAX}$ and the maximum machine velocity $V_{XY-MAX}$.

14. The system of claim 9, further comprising a fan configured to cool the nozzle.

15. The system of claim 9, further comprising a print platform movable in a z-axis.

* * * * *